June 6, 1967

F. A. VITELLARO 3,323,169

MECHANISM FOR QUICKLY ADJUSTING THE DIES
OF A TIRE TREAD EXTRUSION DIE HEAD

Filed Sept. 2, 1965

INVENTOR
FRANK A. VITELLARO
BY
Sperry and Zoda
ATTORNEY

United States Patent Office 3,323,169
Patented June 6, 1967

3,323,169
MECHANISM FOR QUICKLY ADJUSTING THE DIES OF A TIRE TREAD EXTRUSION DIE HEAD
Frank A. Vitellaro, Pennington-Lawrenceville Road, Trenton, N.J. 08638
Filed Sept. 2, 1965, Ser. No. 484,555
9 Claims. (Cl. 18—12)

This invention relates generally to extrusion dies for plastic materials, especially extrusion dies of the universal type designed for extruding tire recapping rubber stock. More particularly, the invention has reference to a mechanism for quickly changing the die positions in a die of the type described such as shown, for example, in Patent No. 2,720,679.

By way of background, it may be noted that a die head of the type shown in the above-designated patent is widely used in the manufacture of tire recapping stock. The die heads as now used for this purpose, however, have a marked disadvantage, in that they require manual operation of the means for adjusting the positions of the several die blocks conventionally provided in such apparatus.

In this connection, the tire recapping stock is extruded in the form of a long, continuous, wide, generally flat web or strip. It will be appreciated, in this regard, that in view of the wide range of tire sizes and types, there is an almost infinite number of variations that are required, with respect to the cross-sectional configuration of said strip. The manufacturer, thus, must fill orders for a wide variety of different combinations of base, crown, and gauge (thickness) sizes. Further, each order calls for a prescribed total number of running feet of length of the strip having the particular base, crown, and gauge needed by the customer.

In filling the orders at hand, the manufacturer runs the die continuously, and makes necessary die changes after each order has been run, to meet the requirements of the next following order. Since the material is being extruded continuously, it will be apparent that during the time that die positions are actually being changed to set the apparatus up for running the next order, the equipment is running pure scrap.

At the present, the die changes are effected manually. The adjustment of the apparatus for changing base and/or gauge sizes necessitates changing the positions of all the die blocks in a row of said blocks. Each block whose position must be changed is adjusted to its new position independently of all the other blocks in the row, by turning of a hand crank. Added to this is the requirement for changing the positions of vertical and inclined trimming knives conventionally provided in apparatus of the character described. When, as is usual, adjustment is needed in the positions of a substantial number of blocks, as well as in the trimming knives, with said adjustments being made while the apparatus is continuously extruding stock, it will be readily apparent that the ratio of scrap to usable stock is very high. Apart from the excessive scrap resulting from operation of the equipment in the conventional fashion described, there is the added factor of down time, that is, the excessive amount of time needed to make the necessary die changes, during which time the machine is not producing stock that meets customers' requirements.

The main object of the present invention is to provide a means for effecting the above-mentioned die changes swiftly, by use of a motorized mechanism that will change die positions, as well as the positions of the trimming knives, in far less time than is required for the manual adjustment of the die blocks as discussed previously herein.

A more particular object of the invention is to provide a motorized die-block-adjustment means which can be mounted upon a universal die head of the type shown in Patent No. 2,720,679, with almost no modification or alteration of the die head as now constructed.

Another object is to provide a mechanism for changing the positions of die blocks on a universal tire tread extrusion die head, which will be so designed as to operate in a trouble-free fashion, and which will be simply and yet ruggedly designed for long usage under adverse conditions.

Still another object is to provide a motorized device for changing the positions of the die blocks in a head of the type stated, that will be capable of manufacture at comparably low cost, considering the benefits to be obtained from the use thereof.

Summarized briefly, the invention includes a supporting frame capable of being mounted directly upon a die head such as shown in the above-designated patent. The frame is provided with a plurality of gear-driven shafts, each of which mates with the adjusting stem or shaft of a die block. Accordingly, rotation of any one of the gear-driven shafts has the effect of correspondingly rotating the stem of the die block, which steam has hitherto been manually rotated for the purpose of elevating or lowering the die block. A motor is associated with each shaft, to drive the same through the gear linkage associated with the shaft. Operation of the motors results responsive merely to adjustment of a slide or other indexing means in respect to a stationary scale, to indicate a desired base width to which the extrusion apparatus is to be adjusted. When the indexing means is moved to the desired position, circuits are closed to the affected motors, causing them to rotate in a direction selected by an operator, so that the die blocks associated with the motors so affected will be raised or lowered as necessary, simultaneously with adjustment of the trimming knives to the new, required position. All the motors operate simultaneously, so that the complete changeover is effected with maximum speed, in a relatively small fraction of the time now required.

In accordance with the invention, provision is included in the mechanism for selecting individual motors for longer or shorter operation in respect to other motors that are being driven at the same time, so as to produce, for example, a different adjustment height for one or more die blocks, in respect to adjacent die blocks, thus to permit so-called "valley die" runs. By operation of selected switches on a conveniently located panel, the operator can run a single motor, a pair of motors, or all the motors as needed.

Other objects will appear from the following description, the claims appended thereto, and from the annexed drawings, in which like reference characters designate like parts throughout the several views, and wherein:

Referring to the drawing in detail, to facilitate understanding of the invention and of the apparatus to which it is typically applied, it is believed advisable to divide the following description into separate portions, under the following headings:

(1) The universal die head to which the invention is applied.
(2) Die block adjustment assembly.
(3) Trimming knife adjustment assembly.
(4) Circuitry.

In considering the construction and operating characteristics of the invention, it is appropriate to understand the construction of associated portions of a universal tire tread extrusion die head, as set forth under the appropriate heading below.

*The universal die head to which the invention is applied*

Figure 1:
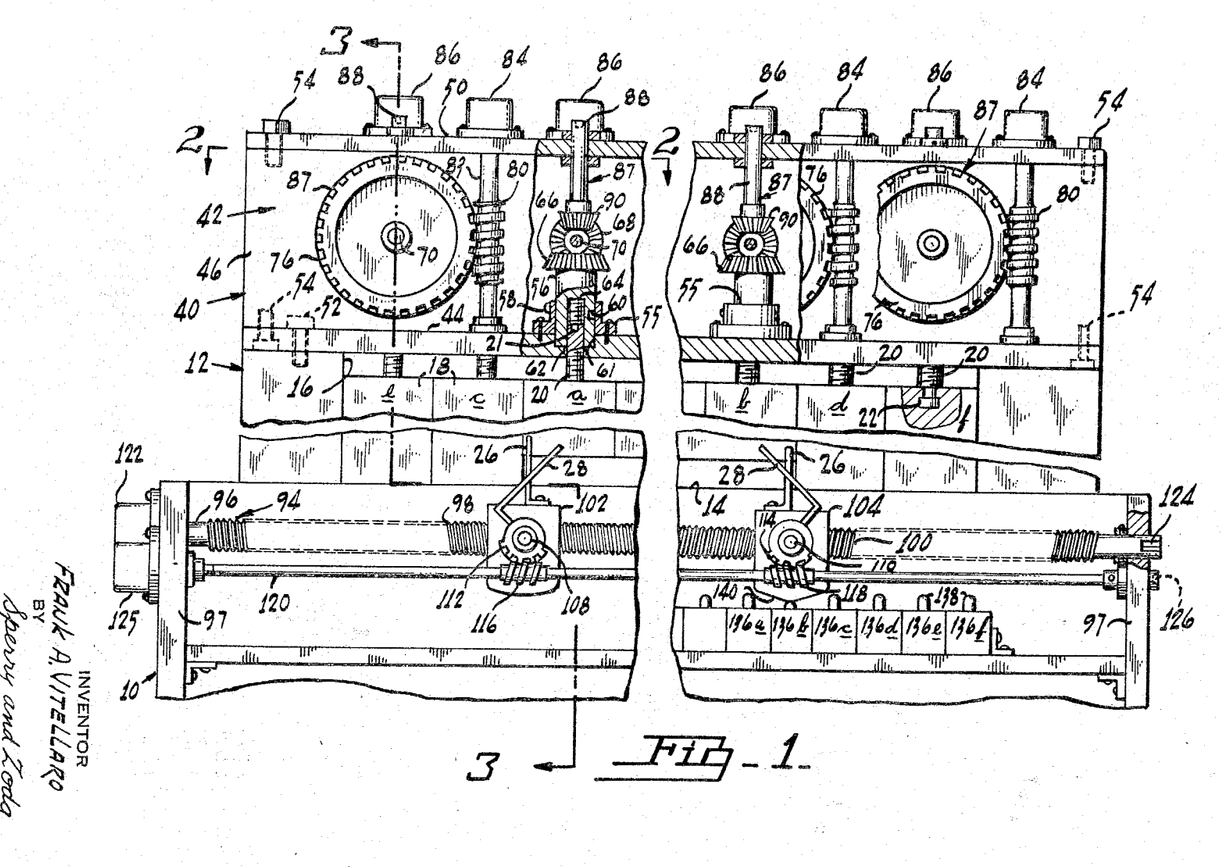
FIG. 1 is a front elevational view in which portions are broken away and other portions are shown in vertical section, of a die-adjustment mechanism according to the present invention, said mechanism being mounted upon a conventional extrusion die head portions of which have been broken away.

Generally designated 10 is a universal die for extruding tire recapping stock. The illustrated die is substantially identical to that shown in Patent No. 2,720,679. For the purpose of understanding the present invention, it is necessary only to show those portions of the die head with which the invention cooperates. Thus, I have shown at 12 a support structure having a slot 14 through which the material is extruded in strip form. The slot is centrally disposed in respect to a mounting opening 16 of support structure 12, in which opening there is provided a series or row of die blocks 18 disposed in side-by-side, contacting relation and mounted for vertical adjustment through the provision of die block adjusting stems 20 swivelly connected at 22 to the upper portions of the die blocks. Stems 20 are threaded and as shown in FIG. 1, are formed at their upper ends with non-circular recesses 21 designed to receive a mating, manually rotatable, removable crank 24.

Support structure 12 is normally provided with a cover plate, not shown, that overlies the row of die blocks, and that has a series of threaded openings in which the stems are engaged. Thus, in the conventional arrangement now in use and exemplified in Patent No. 2,720,679, individual rotation of the stems by manual operation of a crank or equivalent stem-rotating device is necessary to effect vertical adjustment of the several die blocks. Such die block adjustment, as will be appreciated, produces an extrusion slot 14 of desired width and height.

In this connection, and as shown in the above-designated patent, at each side of the center die block there are pairs of blocks symmetrically arranged in respect to the center block. In the illustrated example, thus, there is a pair of blocks *a, b*, a pair of blocks *c, d*, and a pair of blocks *e, f*. In adjusting the die blocks to produce a slot 14 of desired width and height, one might, for example, elevate blocks *a, b*, and all blocks between the same including the center block, to a selected extent, leaving blocks *c, d*, and *e, f* in their fully lowered position. In making the adjustment the operator also adjusts a pair of vertical trimming knives 26 toward or away from each other as necessary, and correspondingly adjusts a pair of inclined trimming knives 28, 28. The inclined knives, further, may be adjusted as to their angle of inclination. As shown in FIG. 1, one knife 26 and a corresponding knife 28 will be arranged one behind the other, slightly inwardly from an adjacent side edge of the extrusion slot 14 defined by elevation of selected die blocks such as the blocks *a, b* and all the blocks between the same.

As a result, when the stock is extruded through slot 14, it will at the point of exit have a cross-sectional shape corresponding to the configuration of the slot. However, immediately in front of the slot, the trimming knives, 26, 28 will operate to trim the side edge portions of the extruded strip to produce wings on the strip such as shown in FIG. 4.

Figures 2, 3, 4:
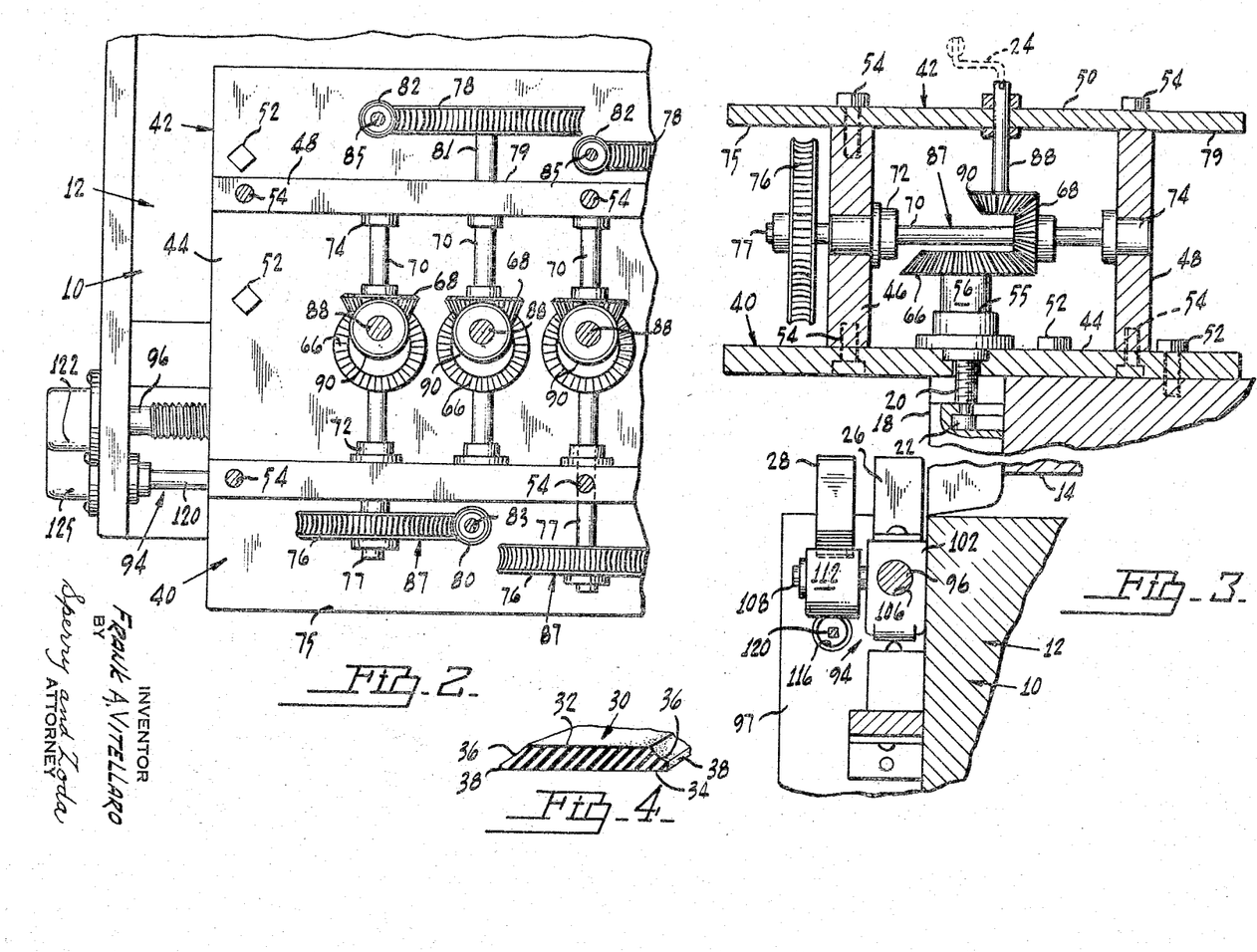
FIG. 2 is a horizontal sectional view substantially on line 2—2 of FIG. 1.
FIG. 3 is a vertical, cross-sectional view substantially on line 3—3 of FIG. 1.
FIG. 4 is a fragmentary perspective view of a tire tread recapping stock strip formed in the illustrated extrusion die.

FIG. 4 shows a typical, extruded strip of tire recapping stock, generally designated 30. The strip is provided with a wide upper face 32 known as the crown, a bottom face or surface 34 known in the art as the base, and side edge portions that are reduced progressively in thickness by inclined top surfaces, said side edge portions being known as wings, and terminating in low lateral, vertical edges 38.

In setting up the apparatus to produce a strip 30 designed to meet the requirements of an order to be filled, one selects a plurality of die blocks for a vertical adjustment in an upward direction, so as to define an extrusion slot 14 of a selected width which, by appropriate placement of the trimming knives 26, 28, will establish a base size for the extruded strip. The appropriate placement of the knives 28, 26, and the disposition of knives 28 at the proper angle, determines the crown size, that is, the width of the upper surface exclusive of the wings 36. Further, the upward adjustment of the die blocks is controlled to produce a predetermined thickness for the extruded strip, that is, a determination of the gauge size, this being the vertical dimension measured between the crown and base.

It may also be necessary to produce a predetermined profile or configuration, in the crown, that is, the center block, or any other selected ones of the blocks elevated to define the slot 14, may be raised or lowered in respect to adjacent blocks so as to define one or more longitudinal recesses, or upstanding ribs, on the crown.

It will be appreciated that since the present practice is to manually adjust each die block, independently of the others, and to further manually adjust the positions of the knives 26, 28, considerable time is lost in changing from one base, gauge, or crown size to another. Since the stock is being extruded continuously, all the stock extruded during the time taken up by one of these changeovers is scrap material. The present invention aims to obviate these deficiencies in present construction and operation of equipment of this type.

All the above is conventional construction, as shown in Patent No. 2,720,679 to particular advantage.

*Die block adjustment assembly*

The device constituting the present invention has been generally designated 40, and is in the nature of a self-contained mechanism bodily mountable upon the support structure 12 of a die head such as shown in the above-designated patent. In mounting the device upon the die head, one would remove the cover plate, not shown, in which the stems 20 are normally threadedly engaged. Thereafter, the device, as a self-contained unit, can be bolted directly to the top of the support structure 12.

The invention, in the typical, illustrated embodiment shown in the drawing, includes a support frame generally designated 42, which in the present instance includes a rectangular base plate 44 (FIGS. 1 and 3) to which are fixedly secured upstanding front and back walls 46, 48 respectively. Fixedly secured to the top edges of, and supported by, the walls 46, 48 is a top plate 50.

The walls 46, 48 are disposed inwardly from the front and back edges, respectively, of the base plate 44, as best shown in FIG. 3.

The support frame, thus, constitutes in effect a hollow enclosure or housing, the front and back walls of which are offset inwardly to define deep recesses at the front and the back of the support frame open to the front and to the rear thereof.

The support frame, as shown in FIG. 3, is fixedly attached to the support structure 12 by means of bolts 52 or the like, in a position in which a substantial portion of the support frame projects forwardly from the support structure above the row of die blocks 18.

The component portions of the support frame can be fixedly secured together in any suitable manner, and in the present instance I utilize a plurality of bolts 54, extending through smooth-walled opening provided in the top and bottom base plates 50, 44 respectively, and threadedly engaged in complementarily threaded recesses of the front and back walls 46, 48.

Intermediate the front and back walls 46, 48 I provide a row of bearing sockets 55 secured to the base plate in coaxial relation to the several stems 20. Rotatably supported in the bearing sockets 55 are shafts 56 which, though freely rotatable in the sockets, are maintained against vertical upward movement in respect to the sockets by any suitable means, as for example by set screws 58 extending radially inwardly through the bearing sockets into circumferential grooves 60 formed in the shafts 56.

Shafts 56 seat in upwardly opening bearing recesses 61 formed in the upper surface of base plate 44, in communication with smooth-walled openings 62 of the base plate. The several stems 20 extend upwardly through the openings 62, and are threadedly engaged in downwardly opening, axial, threaded recesses 64 of the several shafts 56.

Thus, rotation of a shaft 56 in one direction will cause its associated stem 20 to move upwardly to elevate the die block with which it is engaged, while rotation of said shaft 56 in the opposite direction will produce downward movement of the stem and hence of its associated die block.

Integral or otherwise made rigid with the upper ends of the shafts 56 are bevel gears 66, meshing with bevel gears 68 secured to horizontally extending shafts 70 for rotation therewith.

As shown in FIG. 3, shafts 70 extend between the front and back walls, and are rotatably supported in bearings 72, 74 provided in said walls.

Referring now to FIG. 2, in the illustrated embodiment of the invention it is preferred to mount the shafts 70 in a staggered arrangement wherein the shafts will be equidistantly spaced correspondingly to and in registration with the several shafts 56, with one shaft 70 having its forward end portion projecting into the front, forwardly opening recess 75 of the support frame as shown at 77, while the next adjacent shaft 70 projects into the rearwardly opening recess 79 of the support frame as shown at 81.

Rotatable with the forwardly projecting portions 77 of shafts 70, in the recess 75, are gears 76 driven by worms 80. Correspondingly, in the rear recess 79 of the support frame, I provide gears 78 secured to and rotatable with the rearwardly projecting portions 81, and driven by worms 82.

Within the front recess 75, the several gears 76 are staggered as shown in FIG. 2, to provide clearance or running room for adjacent gears. The same arrangement is provided in the rear recess 79.

From the description so far provided, it will be seen that associated with each stem 20, for the purpose of raising or lowering the same, is an individual assemblage of driving components including a shaft 56 threadedly engaged with the stem and having a driven bevel gear 66, a drive bevel gear in mesh with the gear 66, a shaft 70 for driving the gear 68, a gear 76 or 78 for driving the shaft 70, and a worm 80 or 82 for driving the gear 76 or 78.

Worms 80, 82 are fixed to vertical worm gear shafts 83, 85 respectively, bearing in the top plate 50 and base plate 44 within the front and rear recesses 75, 79 respectively of the support frame 42. Mounted upon the top plate are motors 84 the shafts of which are drivingly coupled to shafts 83 in coaxial relation therewith. Rear motors 86 are mounted upon the top plate 50, and are similarly coupled with the shafts 85 in driving relation therewith.

Thus, each of the assemblages associated with the several stems 20 includes its own drive motor 84 or 86, as the case may be.

Each of the above-described driving assemblages associated with stems 20, together with its drive motor 84 or 86, can be considered as a motorized drive means individual to a stem for the purpose of driving the same to elevate or lower the die block in which the stem is swiveled. The reference numeral 86 has been generally applied to each of the several motorized drive means or units.

In the event of malfunction, I provide a means for manually driving each of said units, shown to particular advantage in FIG. 3. A manually rotatable vertical shaft 88 bears rotatably in top plate 50, above and in registration with each shaft 70, and at its lower end has a bevel 90 in mesh with gear 68. At its upper end, shaft 88 has a non-circular recess adapted to receive the hand crank 24 previously described herein. Ordinarily, during the normal driving of a shaft 56 by its associated motor 84 or 86 through the medium of the driving linkage provide for the same, the shaft 88 will merely turn idly. If necessary, however, any shaft 56 can be rotated through the medium of the shaft 88 and hand crank 24 associated therewith.

*Trimming knife adjustment assembly*

I also provide for motorized adjustment of the trimming knives 26, 28. In Patent 2,720,679 the trimming knives are mounted upon follower blocks, which are simultaneously adjusted toward and away from each other as desired. Further, angular adjustment of the inclined trimming knives is effected to whatever extent is desired, in any position to which the follower blocks are moved toward or away from each other as the case may be.

In the patent, the adjustment of the follower blocks is effected manually. In accordance with the present invention, however, the follower blocks are moved responsive to operation of an associated motor, which is energized in a predetermined, cooperating relationship with the motors 84, 86 so as to produce the adjustment of the follower blocks and hence of their supported trimming knives, simultaneously with the adjustment of a plurality of the die blocks, all of which are being moved upwardly or downwardly together, as needed.

The trimming knife adjustment assembly has been generally designated 94, and includes a horizontally disposed shaft 96 extending completely across the front of the support structure 12, immediately forwardly of and offset slightly downwardly from the row of die blocks 18 (see FIG. 3). The shaft 96 bears rotatably, at its ends, in forwardly projecting side walls 97 of support structure 12.

At one side of the center point of the series of die blocks 18, shaft 96 has left-hand threads 98, while at the opposite side of said center point the shaft has right-hand threads 100. Complementarily threaded openings are formed in follower blocks 102, 104 respectively disposed at opposite sides of, and symmetrically arranged in respect to, the center point of the series of die blocks, as shown at 106 in FIG. 3. Accordingly, rotation of shaft 96 in one direction will cause the follower blocks to move toward each other, while rotation of said shaft in the opposite direction will have the effect of moving the follower blocks away from each other.

Rigid with and projecting forwardly from the respective follower blocks are stub shafts 108, 110 respectively, on which are rotatably mounted gear segments 112, 114 respectively carrying the inclined trimming knives 28, these being fixedly secured to the segments for rotation therewith. Thus rotation of the gear segments 112, 114 in opposite directions results in simultaneous raising or lowering of the inclined trimming knives to an equal extent, in any position to which said trimming knives may have been adjusted responsive to travel of the follower blocks 102, 104 along the length of the shaft 96.

For the purpose of rotating the gear segments, there are provided worms 116, 118 in mesh with the gear segments. The worms are formed with square or otherwise non-circular openings slidably receiving a support bar 120 of corresponding cross-section, having circularly shaped ends bearing rotatably in walls 97. Accordingly, when the follower blocks are adjusted toward and away from each other, the worms 116, 118 will be carried therewith by reason of their engagement with the gear segments. Thereafter, by rotation of support bar 120, the gear segments 112, 114 will be rotatably adjusted in opposite directions to correspondingly adjust the inclination of the knives 28. Worms 116, 118 are of opposite hand to require the rotation of the gear segments in opposite directions.

A motor 122 is drivingly engaged with the shafts 96, and is mounted on one of the walls 97. At the opposite end of the shaft 96, a non-circular recess 124 is provided, adapted to receive the crank 24 in the event it is necessary to manually rotate the shaft 96.

A motor 125 is mounted upon support structure 12 adjacent motor 122, and drives shaft 120. At the end of the shaft remote from motor 125, shaft 120 has a non-circular opening 126 adapted to permit manual rotation of the shaft or bar 120 by hand crank 24 whenever necessary. Ordinarily, however, motor 125 is adapted to rotate the bar 120 for the purpose of adjusting the angle of inclination of the knives 28, in any position of the follower blocks 102, 104.

*Circuitry*

Figure 5:
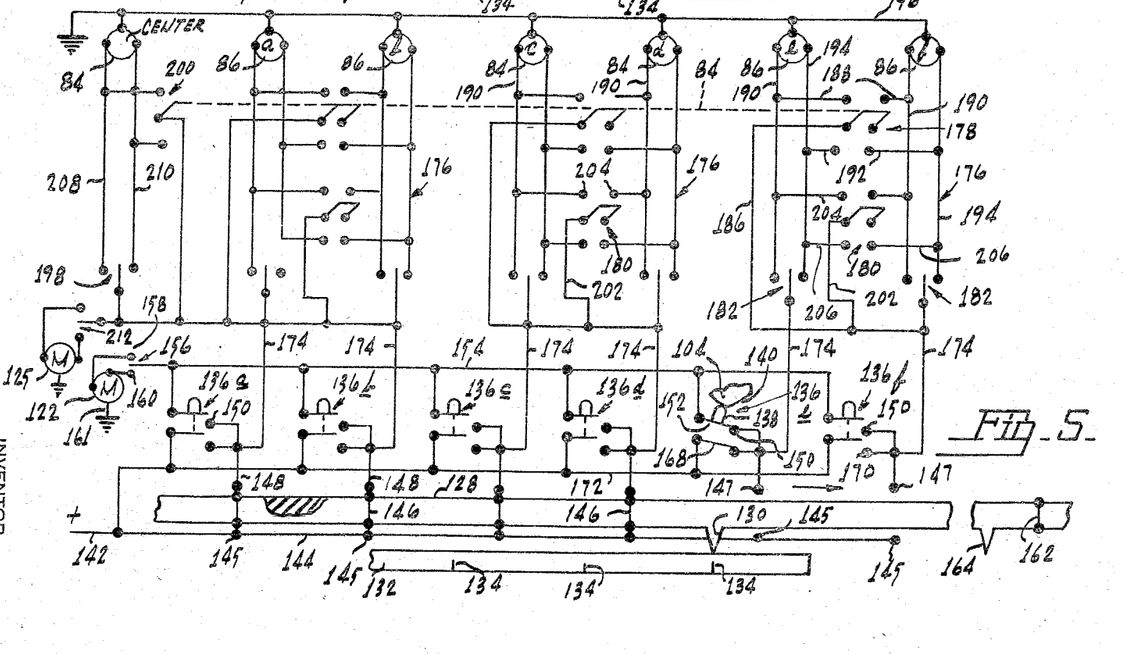
FIG. 5 is a schematic view showing, fragmentarily, a circuit embodied in the invention.

A circuit capable of producing operation of the several motors, in the desired sequence and cooperating relationship, is shown in FIG. 5.

The purpose of the circuitry illustrated is to achieve the simultaneous adjustment of follower blocks 102, 104 and of selected die blocks 18 to desired new positions, from whatever positions they may have been in during running of the next previous order. The circuitry is also designed to permit the operator to adjust the knives 28 by operation of the motor 125, to new angles of inclination, after, before, or for that matter simultaneously with the adjustment of the follower blocks toward or away from each other. The circuitry is also designed to permit any selected pair *a, b, c, d,* etc., of die blocks 18 to be adjusted vertically independently of any other pair of die blocks. The circuitry is further arranged to permit any single die block to be so adjusted, independently of any other die block.

In accordance with the invention, I provide a slide 128 of electrically insulating material, having a pointer 130 adapted to traverse a stationary scale 132 having indicia 134. The indicia are in increments representing base sizes as regularly known to and used in the industry.

Assuming, thus, that an order has been run with a base size as shown in FIG. 1, that is, with blocks *a, b* and all blocks between the same elevated, and assuming further that the next order is for a larger base size involving the elevation of blocks *e, f* and all blocks between the same, one would move the slide 128 to the right in FIG. 5 as shown by the directional arrow, until pointer 130 registers with the indicium 134 that represents the new, larger base size.

Figure 6:
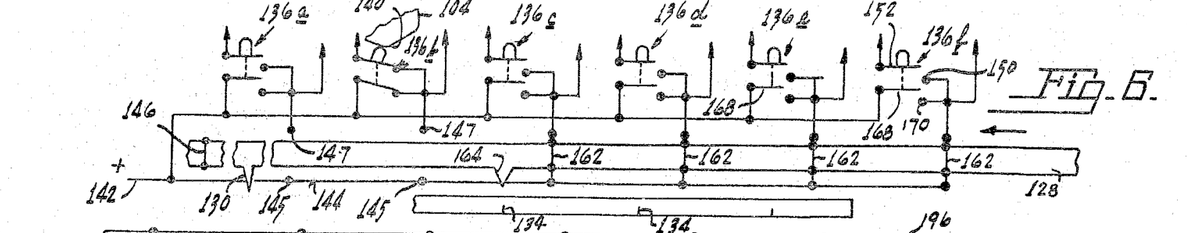

If, after running an order with a larger base size, one desires to run an order with a smaller base size, the slide 128 is moved to the left as shown by the directional arrow in FIG. 6, until a second pointer designated 164, and disposed to the right of the pointer 130 as viewed in the drawings, registers with the indicium 134 representing the new, smaller base size.

In other words, whenever a base size is to be increased, slide 128 is moved to the right as viewed in the drawing and pointer 130 is used to register with the indicium representing the desired, larger base size. Whenever, on the other hand, a base size is to be reduced, slide 128 is moved to the left until pointer 164 registers with the indicium 134 that represents the new dies.

Ordinarily, when a group of orders is to be run, the orders would be so arranged or programmed as to require the least possible adjustment in changing over from one order to the order next following the same. It would be usual that the orders would be programmed basically for gauge size, but within this basic programming concept, one may program for base sizes, that is, arrange the order to be run in such a way that the base sizes will ascend in value through as many orders as possible, before beginning a descent through a next following group of orders. This is to be preferred over an arrangement wherein one would run an order with a particular base size, then going to a smaller size on the next order, then to a larger size on the next order, etc.

Although I have shown by way of example a straight slide having rectilinear motion, it is believed sufficiently obvious as not to require special illustration that I might use, instead, a dial carrying the pointers and rotatable in respect to a stationary scale, said dial being rotatable in either a clockwise or counterclockwise direction, to correspond to the back-and-forth straight-line movement of the slide illustrated by way of example.

Referring now to FIG. 1, I provide a row of switches 136*a*, 136*b*, 136*c*, etc. These are double-pole, single-throw switches. Each is individually associated with a separate die block, that is, switch 136*a* is in individual controlling relationship to die block 18 designated *a*, switch 136*b* is in similar relationship to the die block designated *b*, etc.

All the switches are disposed at one side of the center line of the series of die blocks. The switch nearest the center line would control the center die block, which of course is not paired with any other die block since it is directly on center in the row of die blocks. Said switch nearest the center would be in individual controlling relationship, also, to the die block at the left of and in contact with the center die block. The next adjacent switch, in a direction away from the center point of the series of die blocks, would control the die block disposed in contact with the center block, and located at the right of the center block. This is exemplified in FIG. 1, wherein it will be noted that switch 136*a* is in controlling relation to die block designated *a* which is at the left of the center while switch 136*b*, disposed as the next switch in a direction away from the center, is in similar relationship to die block *b* paired with die block *a* and located at the right of the center.

The several switches have depressible plungers 138 the centers of which are spaced correspondingly to the base size increments. Block 104, at its lower end, has a polished, smooth, cam surface 140 sloping upwardly from opposite sides of the center point of the follower block 104 as shown in FIG. 1, and adapted to depress the plungers 138. It will be understood that any suitable means can be provided on the follower block for depressing the switch plungers, as for example a roller should it be desired to reduce frictional resistance to a minimum.

In the illustrated example, the construction is so designed that when the follower block 104 is in motion, it will close a particular switch by depression of the plunger thereof, before the opening of a switch next preceding the same in the sense of the order in which the switch plungers are depressed. In other words, and considering FIG. 1, if follower block moves to the right in this figure of the drawing from the position shown, it will depress the plunger of switch 136*c* sufficiently to close switch 136*c*, before it permits the plunger of switch 136*b* to move back upwardly enough to open switch 136*b*. This is true regardless of the direction in which the block 104 is moving, due to the symmetrical formation of the cam surface 140.

The purpose of this arrangement is to assure continuity of power to the motor 122 driving shaft 96 on which follower block 104 is mounted. At such time as power to the motor 122 is broken, follower block 104 will come to rest in a central position in relation to the last switch closed by it, as for example switch 136*b* when the parts are viewed as in FIG. 1.

A lead 142 extends from a suitable source of electrical power, and supplies positive current through a bus bar 144 or equivalent means providing a common connection for a series of spaced, stationary contacts 145, to said source of power.

The stationary contacts 145 are spaced apart correspondingly to the above-discussed increments in base sizes. In confronting relation to the several stationary contacts 145 are stationary contacts 147. Thus, the invention embodies a series of spaced sets of normally open, stationary contacts, spaced apart according to the base size increments.

Slide 128 carries a plurality of correspondingly spaced contact-bridging elements 146. These extend across slide 128. The sets of stationary contacts 145, 147 are so arranged that the slide moves between the contacts of each step. Responsive to movement of the slide to a predetermined, desired position, one will bridge a correspondingly predetermined number of the sets of stationary contacts 145, 147 while leaving others open.

Each contact 147 has an electrical connection 148 to one pole 150 of a particular, associated switch 136. Each switch in this series has a first movable switch arm 152, which in its closed position (to which it is moved by depression of the switch plunger 138) provides a connection between the pole 150 and a lead 154 that provides a common connection between all the switch arms 152 and motor 122 driving shaft 96. Power is supplied to motor 122 through the lead 154, and interposed between the motor and said lead 154 through which power is so supplied is a single-pole, double-throw, manually operable switch 156. Switch 156 when operated in one direction provides a connection between the power lead 154 and pole 158 to operate motor 122 in one direction. The motor is of the reversing type, and will operate in the opposite direction by throwing switch 156 in a direction to provide a connection between lead 154 and pole 160. Pole 160 has an electrical connection to the terminal of motor 122 that produces reverse operation of the motor. The motor has a connection 161 to ground, for return of power supplied thereto through poles 158 or 160 as the case may be.

Assuming that a particular base size has been run, as for example, a base size as shown in FIG. 1 in which blocks *a*, *b* and all blocks between the same are elevated, and switch 136*b* is the last switch depressed, and assuming further that the next order is for a base size produced by stoppage of follower block 104 on switch 136*e*, one shifts slide 128 to the right in FIG. 5, until pointer 130 is located over indicium 134 corresponding to the positioning of follower block 104 directly on center with switch 136*e*.

This positioning of slide 128 causes bridging of those sets of contacts 145, 147 associated with switches 136*a*, 136*b*, 136*c*, and 136*d*, but not (as shown in FIG. 5) switch 136*e*.

Let it be assumed, further, that to rotate shaft 96 in a direction to move block 104 from switch 136*b* to 136*c*, power should be supplied through pole 158 of switch 156. Accordingly, the operator throws switch 156 to a position whereby power will be supplied to motor 122 through pole 158. When this is done, and with the slide previously adjusted to its new position as described above, power will flow through lead 142 and bus bar 144, and will initially pass through the closed contacts 145, 147 supplying power to switch 136*b* which, as above noted, was in depressed position (see FIG. 1) at the start of the changeover. Power will thus be supplied to motor 122, and follower block 104 will move to the right in FIG. 1. Follower block 104 will close switch 136*c* before 136*b* opens, so that motor 122 operates continuously. Then, switch 136*d* closes, to supply power through its associated, bridged contacts 145, 147 to the motor 122. Then, block 104 continues moving until it depresses the plunger of switch 136*e*. However, the contacts 145, 147 associated with switch 136*e* have been left open. Accordingly, as switch 136*d* opens and block 104 comes to rest directly over switch 136*e*, the operation of motor 122 stops. Follower blocks 102, 104 are thus at their new positions, on center with blocks *e* and *f* respectively.

It is to be noted, in this regard, that slide 128 has two distinct sets of bridging elements. The number of bridging elements 46 is one less than the number of switches 136, since the block 104 should not go beyond the end switch 136*f*, and will stop on said end switch only if the contacts 145, 147 associated with said end switch are left open.

The second set of contact bridging elements carried by slide 128 comprises bridging elements 162. These are spaced similarly to the elements 146 of the first set. However, the second set of bridging elements is so located on slide 128 that whenever any element 146 is in a position bridging a set of contacts 145, 147, no bridging element 162 is in a contact-bridging position. Similarly, whenever any element 162 is in a contact-bridging position, all the elements 146 are physically removed from positions in which they can discharge a bridging function. To do this, in a slide having straight-line movement, one need merely space the set of bridging elements 146 from the bridging elements 162 a distance slightly greater than the length of either of these sets of bridging elements.

In any event, assuming that one is proceeding from a larger base size to a smaller base size, one shifts the slide 128 to the left in FIGS. 5 and 6, to bring the bridging elements 162 into use. Elements 146, in these circumstances, will be physically located completely to the left, viewing the parts as in FIG. 6, of the bank of switches 136.

In reducing the base size, the pointer 130 is not used, since it is associated with the bridging elements 146. Instead, a pointer 164, associated with the set of elements 162, is used, and is registered with that indicium 134 that represents the smaller, desired base size. Assume for the sake of example that one is going from a base size represented by disposition of blocks 104 over switch 136*e*, to a smaller base size represented by disposition of block 104 over switch 136*b*, that is, a base size such as shown in FIG. 1. Having readjusted the slide to the position thereof shown in FIG. 6 by moving the same to the left from its FIG. 5 position, the operator throws switch 156 to close a circuit through pole 160 so as to cause operation of the motor 122 in a direction to move blocks 102, 104 toward each other. Slide 128, as shown in FIG. 6, will now be in a position in which starting with the switch 136 that is furthest from the center of the series of die blocks, all sets of contacts 145, 147 of the switches will be bridged up to but not including switch 136*b*. At the start of the operation, block 104 is in its FIG. 5 position, and accordingly, with switch 156 closed to pole 160, the motor 122 will begin to operate in a reverse direction, with power initially flowing through the bridged contacts 145, 147 associated with switch 136*e*. The follower block, moving to the left, depresses in succession the plungers of switches 136*d*, 136*c*, and 136*b*. In the manner described above with reference to the FIG. 5 showing, the motor operates continuously until the block 104 is over switch 136*b*. The motor will now stop, when block 104 completely disengages from the plunger of switch 136*c*. Follower blocks 102, 104, accordingly, are now in their new position for running stock to the new base size.

The exact base size, of course, is determined by the positions of the trimming knives 26, 28, since these trim the side edge portions of the strip of stock extruded through slot 14.

Obviously, the amount of scrap trimmed off the sides of the extruded stock should not be any greater than it has to be. It is for this reason that blocks are lowered beyond the space embraced by the two sets of trimming knives. For example, in FIG. 1, with knives 26 located to trim the stock to a particular, desired base size, blocks *c*, *d*, and all blocks disposed beyond the same on both sides of the extrusion area, are in fully lowered positions. Therefore, knives 26 are very close to the sides of slot 14 defined by the lowered blocks *c*, *d*, so as to hold to a minimum the scrap trimmed from the sides of the extruded stock.

It therefore becomes important that when the follower blocks 102, 104 are adjusted to produce a particular base size, there is a related selection of die blocks that must be raised, to produce an extrusion slot that will be wider than the space between knives 26, but no wider than absolutely necessary consistent with keeping the mechanism as simple as possible.

Accordingly, in the present instance but not necessarily, I provide an arrangement wherein there are two increments for each die block width. Block 104 accordingly, moves through two positions, that is, two base sizes, before any additional pairs of die blocks are raised or lowered. For example, in FIG. 1, block 104 could be in position directly over switch 136a, to produce a particular base size, and in these circumstances blocks a, b and all blocks between the same would be raised. This would increase the amount of scrap trimmed off by knives 26, 28 somewhat, since the amount of scrap trimmed off each side would represent about half of the thickness of a die block.

If a base size as shown in FIG. 1 is required, with block 104 over block 136b, there would be no change in the die block arrangement from that shown, that is, blocks a, b and all blocks therebetween would be raised.

If, now, block 104 is caused to move to and remain in position over switch 136c, it would now be essential to elevate blocks c, d, together with all blocks therebetween. Then, if block 104 is moved to a position over switch 136d to provide yet another base size, there would be no change in the die block arrangement, that is, blocks c, d and all blocks therebetween would remain elevated.

The circuitry shown in FIG. 5 accomplishes the results outlined above. As previously noted, each of the switches 136 is of the double-pole type. Accordingly, each of said switches includes, in addition to the switch arm 152 hereinbefore described, a switch arm 168 movable conjointly with arm 152. Each switch further includes a second pole 170 engageable by the switch arm 168 whenever the switch plunger 138 is depressed. Pole 170 is electrically connected to contact 147 associated with the switch.

The several switch poles 170 are connected to leads 174 extending to a plurality of control circuits 176 for motors 84, 86 hereinbefore described. It will be noted, in this regard, that there is a separate motor control circuit 176 for each pair of motors a, b, c, d, etc. Further, there are two leads 174 extending to and supplying power to each circuit 176. Each lead 174 extends from a separate one of the switches 136, and as noted from FIG. 5, the leads 174 extending from switches 136e and 136f respectively, are both extended to the control circuit 176 associated with the motors 86 that elevate and lower the die blocks designated e and f. The lead 174 extending from switch 136e is adapted to supply power to the motor associated with die block e, and the lead 174 extending from switch 136f is similarly adapted to supply power to the motor 86 that elevates or lowers die block designated f.

In each control circuit 176 there is a double-pole, double-throw switch 178. This switch is operated conjointly with all similar switches 178 of the several motor control circuits 176.

In each control circuit 176 there is also a double-pole, double-throw switch 180. This switch is a control for the two motors of the same control circuit. Switch 180, when closed, will supply power only to these two motors, independently of the supplying of power to any other set of motors.

Also in each of the several control circuits 176 are two single-pole, double-throw switches 182. These are operable independently of each other and of all other similar switches in the various control circuits, so as to produce operation of a single motor 84 or 86 as the case may be, independently of operation of its paired motor in the same control circuit.

All the switches 178 are connected for joint operation as shown schematically at 184. In practice, I may utilize a single rotary, stacked wafer switch assembly, which in effect would comprise a plurality of superimposed switches 178, all contained in a common switch housing, each switch 78 including its own rotary contact and stationary sets of contacts, with all of the rotary elements of the several, stacked switches 178 being conjointly rotatable by a single handle.

In any event, let it be assumed by way of example that follower block 104 is to move and come to rest at its FIG. 5 position, depressing the switch arms 152, 168 of switch 136e to produce a particular base size. This base size would require that blocks e, f and all other die blocks therebetween be elevated. As the block 104 moves to the right in FIG. 5 toward switch 136e responsive to location of slide 128 in the FIG. 5 position and closure of switch 156, the circuits to the several motors controlling the die blocks elevation and lowering will be permitted to remain open. They will remain open because the several switches 178, 180, and 182 are all, at this time, in their open positions.

Let it be assumed, in this regard, that when this changeover cycle began, blocks a, b and all blocks between the same were elevated. Let it further be assumed that blocks c, d and e, f are to be elevated to the same extent as blocks a, b and all blocks therebetween were elevated for the last previous order. In other words, it is being assumed that the new order, though calling for an increase in base size, involves the same gauge size as the last previous order.

In these circumstances, when block 104 finally comes to rest on switch 136e, the operator closes the switches 180 of the control circuits 176 of blocks c, d and e, f. The control circuit of blocks a, b, and the control circuits of all blocks therebetween including the control circuit for the center die block, are left open, since these blocks are already in correct position and need be neither elevated nor lowered.

In each control circuit 176, there is a lead 186 extending from a common connection with the two leads 174 supplying power to the particular control circuit, said lead 186 extending to the movable, double contact of the switch 178 of the control circuit. Leads 188 extend from one set of poles of the switch 178, to a connection with leads 190 extending to the terminals of the associated motors 84 or 86 as the case may be, to supply power for operation of said motors in one direction.

The other poles of switch 178 of each control circuit 176 are connected by leads 192 to leads 194 extending to the terminals of the motors that produce reverse operation. Common to all of the motors of the apparatus is a ground connection 196.

A lead 202 extends to the movable, double contact of each switch 180, from the common connection to leads 174 of the same control circuit.

Returning now to the discussion of the particular change-over involving the elevation of blocks c, d and e, f to heights equalling those to which blocks a, b and all blocks therebetween have already been elevated, the several switches 182, 180, and 178 of all control circuits for the already elevated blocks are left open. With block 104 now at rest on switch 136e, the operator closes the switches 180 of the control circuits associated with the die blocks c, d and e, f, while leaving switches 178 and 182 of these particular control circuits open.

Let it be assumed that to operate the motors associated with blocks c, d and e, f in a direction to elevate said blocks, power should be supplied through leads 190 to the motors in question. In this event, the movable arms of the operated switches 180 are swung upwardly to supply power through lead 202 to leads 204 connected to leads 190. If the motors were to be operated in a block-lowering direction, the switch would be operated to close a circuit through leads 206 to the motors, said leads 206 being connected to the leads 194.

In any event, power flows to the motors that elevate or lower die blocks c, d and e, f, as follows: from the source of power, the current flows through bus bar 144 through the bridged sets of contacts 145, 147 associated with switches 136c and 136d. Although these switches are open at this time, the power flow by-passes these particular switches, since leads 174 have direct connections to the bridged sets of contacts 145, 147.

Accordingly, in the control circuit 176 associated with the motors for blocks c, d, power flows through leads 174, lead 202, leads 204, and leads 190 to the motors 84, causing elevation of the blocks c, d.

At the same time, since switch 136e is closed even though its associated set of contacts 145, 147 is not bridged, power will flow from the source of electrical power through lead 172, arm 168 of switch 136e, and lead 174 extending from switch 136e, said power thereafter flowing to motors 86 through lead 202, switch 180, leads 204, and leads 190 of the control circuit 176 associated with the motors that operate die blocks e, f.

There is, thus, simultaneous operation of the motors controlling the movement of die blocks c, d and e, f. The operator observes the extent to which these motors are elevated, and when they have been elevated to the same degree as the already elevated blocks a, b, the switches 180 of the affected control circuits 176 are returned to open position.

It will be understood, in this regard, that means could be provided for automatically opening the switches when the die blocks are raised to a selective gauge, as for example by associating with each die block or set of die blocks a gauge-indicating device that will operate the switch when the die blocks are elevated to the desired gauge size.

In an instance in which all the blocks are to be moved upwardly or downwardly, one would use the conjointly operable switches 178, to simultaneously close all the several circuits 176 in a manner to produce operation of the several die-block-adjusting motors 84, 86 in a selected direction, according to whether the blocks are to be raised or lowered.

In this connection, I provide a modified control circuit for the motor 84 that elevates and lowers the center block. This includes leads 208, 210 corresponding to the leads 190, 194 previously described. A single-pole, double-throw switch 198 has a movable arm connected electrically with the leads 174 extending to the control circuit for the die blocks nearest the center. A single-pole, double-throw switch 200 has its respective poles connected to the leads 208, 210 respectively, and is linked with the several switches 178 for operation conjointly therewith.

Therefore, if switches 178 are closed, switch 200 will close therewith, so that the center die block is raised or lowered together with all the other die blocks.

If operation of the center die block alone, without operation of any other die blocks, is desired, one would use the switch 198, closing a circuit to the motor for the center block through either lead 208 or 210, as desired.

In some instances, it becomes necessary to run an order involving what is known to the trade as a "valley die" set-up. This is an arrangement in which the crown of the stock has one or more depressions, or ribs, that is, said crown has surfaces running longitudinally thereof that are raised or lowered, as the case may be, in respect to the main or general plane of the crown. This may involve elevaton of a single block, or lowering of said block, in relation to the remaining blocks, even its associated paired block. This is the purpose of the switches 182. With switches 178 and 180 of a particular circuit open, a selected switch 182 can be closed, so as to energize only the motor associated with that switch. It is even possible that switches 178 or 180 be closed, while switch 182 is open, so that after all the blocks are raised or lowered, switches 178 or 180 are opened, while switch 182 associated with a particular motor is kept closed for further elevation or lowering of the die block associated with that particular switch 182.

The several switches would be located in a compact arrangement, on a control panel, so as to be swiftly available to the operator, for the purpose of controlling the operation of the apparatus.

It is appropriate to note that in some instances, the angle of inclination of the knives 128 must be changed, this being done by operation of motor 125 in a selected direction. Motor 125 as shown in FIG. 5 is controlled by a manually operable switch 212. This switch is of the single-pole, double-throw type, to permit reversing of the motor, and has its movable arm directly connected to the power supply extending to the control circuit 176 that controls the positioning of those die blocks nearest the center block. Simultaneously with movement of the follower blocks, or with raising or lowering of the die blocks, one would close switch 212, to change the angle of inclination of the knives 28 as desired. Suitable gauge means can be employed to permit the operator to know when the desired angle has been reached, after which switch 212 is opened immediately.

It will be understood, of course, that the circuitry shown in FIGS. 5 and 6 is merely exemplary of a circuit that can be utilized in producing the motions needed in the raising and lowering of a selected one, a selected pair, or the entire series of die blocks. I may vary the circuitry according to the needs of the particular situation, and do not desire to be limited to the particular circuitry shown, except as necessarily required by the scope of the claims appended hereto.

Also, as previously noted herein the means for establishing the base size, involving slide 128 and associated components, can be varied. Again, I do not desire to be limited to the particular example of such means, except as necessarily required by the scope of the claims.

Still further, it is important to note that the number of die blocks, the spacing between the die block centers, and the extent to which they may be raised or lowered can all be varied as desired. In the illustrated example, I have merely shown three sets of die blocks and a center block. There could be any number of sets, as desired. This would involve a corresponding change in the number of switches 136, the number of control circuits 176, etc. It is to be further understood, in this regard, that I have not specified the increments, in inches or fractions thereof, that would be selectable in use of the apparatus. These too can be of any value, and of any quantity found desirable or necessary in the industry.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

I claim:

1. The combination, with a series of blocks mounted in an extrusion die for individual adjustment by a generally rectilinear motion thereof to selected extrusion-opening-forming positions, of an adjusting mechanism for said blocks comprising:

(1) a supporting frame mountable on said die adjacent said series of blocks;

(2) a plurality of drive motors mounted on said frame, each of said motors being individual to at least one block of said series;

(3) driving linkages extending between the motors and their associated blocks, said linkages being carried by said frame and being of the motion-translating type converting rotary motion of the shafts of the motors to said rectilinear motion of the blocks; and
(4) means to energize said motors both individually to provide corresponding individual adjustment of selected blocks in respect to other blocks, and by group to adjust a corresponding grouping of blocks simultaneously, including
  (a) switches controlling the flow of electrical current to the several motors, and
  (b) index means settable by an operator at selected locations according to the selection of the die blocks to be adjusted, said index means being operable to select switches through which current may flow, responsive to setting of the index means at a desired location, the index means including gaps in the paths of power flow to the respective switches, said index means further including a movable member having a series of elements bridging selected gaps in correspondingly selected positions to which said member is moved by an operator.

2. The combination, with a series of blocks mounted in an extrusion die for individual adjustment by a generally rectilinear motion thereof to selected extrusion-opening-forming positions, of an adjusting mechanism for said blocks comprising:
  (1) a supporting frame mountable on said die adjacent said series of blocks;
  (2) motors mounted on said frame, said motors being individual to the several blocks of said series;
  (3) driving linkages extending between the motors and blocks, said linkages being carried by said frame and being of the motion-translating type converting rotary motion of the shafts of the motors to said rectilinear motion of the blocks;
  (4) means to energize said motors both selectively to adjust selected blocks in respect to other blocks, and as a group to adjust all the blocks simultaneously;
  (5) trimming means mounted adjacent said blocks for adjustment to selected positions in which said trimming means is effective to trim material extruded through the opening defined by the blocks;
  (6) at least one motor having a driving connection to said trimming means effective to adjust the same to the selected positions thereof; and
  (7) means operated by the trimming means responsive to movement to the position selected therefor and controlling selection of the block-adjusting motors to be energized.

3. The combination of claim 2 wherein said trimming means includes a follower block movable during said adjustment of the trimming means, said last named means including a series of switches individually controlling the flow of current to the block-adjusting motors, said follower block traversing the switches and operating the same during its movement to a selected position of adjustment, at least one of said switches, when operated by the follower block, closing a circuit to the die-block-adjusting motors selected for energization.

4. The combination of claim 3, further including index means settable by an operator at selected locations according to the selection of the die blocks to be adjusted and of the position to which said trimming means is to be moved, said index means being operable to select switches through which current may flow, responsive to setting of the index means at a desired location.

5. The combination of claim 4 wherein said index means includes gaps in the paths of power flow to the respective switches, and a movable member including a series of elements bridging selected ones of the gaps in correspondingly selected positions to which said member is moved by an operator.

6. The combination of claim 2 said trimming means includes first and second follower blocks, fixed and movable knives carried by each block, and a shaft having threads of opposite hand with which the follower blocks are threadedly engaged, said last-named motor being drivingly engaged with said threaded shaft, at least one of the follower blocks actuating the means operated by the trimming means for controlling selection of the die-block-adjusting motors.

7. The combination of claim 6 wherein the movable knives are mounted for simultaneous adjustment in opposite directions to selected positions of inclination in respect to the fixed knives, and motorized means for adjusting the movable knives.

8. The combination of claim 7 wherein the motorized means for adjusting the movable knives is operable independently of the operation of the first and second named motors.

9. The combination of claim 8 wherein the motorized means for adjusting the movable knives comprises a bar of non-circular section extending adjacent the threaded shaft in parallel relation thereto, worm gears sliding on the bar and retained by the bar against rotary motion, gear segments in mesh with the respective worm gears and carrying the movable knives, said gear segments being rotatably supported on the respective follower blocks, and a motor drivingly engaged with said bar for rotating the same independently of the rotation of said threaded shaft.

References Cited

UNITED STATES PATENTS

| 2,488,830 | 11/1949 | Redington | 18—12 |
| 2,720,679 | 10/1955 | Ratliff | 18—12 |
| 3,003,245 | 11/1961 | Nunez | 18—12 XR |
| 3,112,527 | 12/1963 | Pankratz et al. | 18—12 |
| 3,122,789 | 3/1964 | Coffee. | |
| 3,195,183 | 7/1965 | Phillips | 18—12 |
| 3,238,563 | 3/1966 | Hoffman | 18—12 |

FOREIGN PATENTS

| 761,784 | 1/1956 | Great Britain. |

OTHER REFERENCES

S.P.E. Journal, June 1963, pages 561–564.

WILLIAM J. STEPHENSON, *Primary Examiner.*